(12) United States Patent
Scott et al.

(10) Patent No.: US 10,182,349 B1
(45) Date of Patent: Jan. 15, 2019

(54) SYSTEM AND METHOD FOR USER IDENTIFICATION AND AUTHENTICATION

(71) Applicant: JPMorgan Chase Bank, N.A., New York, NY (US)

(72) Inventors: Kelly W. Scott, Delaware, OH (US); Tina Sanders Pragoff, Kennett Square, PA (US); Ravi Acharya, Philadelphia, PA (US); Michael W. Andrews, Dublin, OH (US); Michael L. Traxler, Westerville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 19 days.

(21) Appl. No.: 15/135,918

(22) Filed: Apr. 22, 2016

Related U.S. Application Data

(62) Division of application No. 14/589,711, filed on Jan. 5, 2015, now Pat. No. 9,344,423, which is a division of application No. 13/644,326, filed on Oct. 4, 2012, now Pat. No. 8,955,073.

(51) Int. Cl.
*H04W 12/06* (2009.01)
*H04L 29/06* (2006.01)

(52) U.S. Cl.
CPC .......... *H04W 12/06* (2013.01); *H04L 63/083* (2013.01)

(58) Field of Classification Search
CPC ... H04L 63/0815; H04L 63/08; H04L 63/083; H04L 67/02; G06F 21/41; H04W 12/06

USPC ............................................................. 726/8
See application file for complete search history.

(56) References Cited

U.S. PATENT DOCUMENTS

| | | | |
|---|---|---|---|
| 2005/0010786 A1* | 1/2005 | Michener ............... | G06F 21/34 713/185 |
| 2009/0217178 A1* | 8/2009 | Niyogi ................... | G06Q 10/00 715/753 |
| 2011/0088087 A1* | 4/2011 | Kalbratt ................. | G06F 21/33 726/7 |

* cited by examiner

*Primary Examiner* — William S Powers
(74) *Attorney, Agent, or Firm* — Hunton Andrews Kurth LLP

(57) ABSTRACT

Systems and methods for user identification and authentication are disclosed. In one embodiment, a method of authenticating a first party to a second party may include the following: (1) receiving, from one of an electronic device of a first party and an electronic device of a second party, a request to generate authenticating indicia; (2) using at least one of a plurality of computer processors, generating the authenticating indicia; (3) transmitting, over a network, the authenticating indicia to the electronic device of a first party and to the electronic device of the second party; (4) receiving, from an electronic device of the second party, an indication that the second party has confirmed that the first party is authentic; and (5) storing an identity of the first party, the second party, and the authenticating indicia in a database.

5 Claims, 7 Drawing Sheets


SYSTEM AND METHOD FOR USER IDENTIFICATION AND AUTHENTICATION

This patent application is a divisional of U.S. patent application Ser. No. 14/589,711, filed Jan. 5, 2015, which is a divisional of U.S. patent application Ser. No. 13/644,326, filed Oct. 4, 2012, the disclosure of which is hereby incorporated by reference in its entirety.

BACKGROUND OF THE INVENTION

Field of the Invention

The present invention generally relates to identification and authentication of mobile devices and/or users.

Description Of The Related Art

When a customer calls a service provider, that customer is often required to enter, to a voice response system or into a touchtone system, identifying information such as a phone number, account number, part of his or her social security number, etc. before speaking to a representative. More often than not, the customer is asked to provide this information again when connected with the representative. This is frustrating to customers and results in a bad customer service experience.

The same may hold true for employees communicating with other employees who are located remotely. Due to security concerns, the initiating employee may need to provide identification, such as an employee identification number, to the receiving employee before discussions can begin. If such identification is oral, there is a risk of being overheard.

SUMMARY OF THE INVENTION

Systems and methods for user identification and authentication are disclosed. According to one embodiment, a method of authenticating a first party to a second party may include (1) receiving, from an electronic device of a first party, a request to generate authenticating indicia to be used with a second party; (2) using at least one of a plurality of computer processors, generating the authenticating indicia; (3) transmitting, over a network, the authenticating indicia to the electronic device of a first party; (4) receiving, from an electronic device of the second party, received authenticating indicia; (5) using at least one of the plurality of computer processors, determining that the received authenticating indicia corresponds to the authenticating indicia; and (6) notifying at least one of the first party and the second party of the result of the determination.

In one embodiment, the request may further include an identification of an issue, and the identification of the issue is provided to the second party with the account information for the first party.

The request to generate authenticating indicia, may be received from an application executed by at least one computer processor in the electronic device of the first party.

In one embodiment, the indicia may be generated as a random number. In another embodiment, the indicia may generated as a pseudo-random number.

In one embodiment, the indicia may comprise alphanumeric characters.

In one embodiment, the computer processor that generates the authenticating indicia, the electronic device of the first party, and the electronic device of the second party may be within the same network.

In one embodiment, the received authenticating indicia and the authenticating indicia correspond if they are the same. In another embodiment, the received authenticating indicia and the authenticating indicia correspond if they are substantially the same. In another embodiment, the received authenticating indicia and the authenticating indicia correspond if they are related.

In another embodiment, a method of authenticating a first party to a second party may include (1) receiving, from one of an electronic device of a first party and an electronic device of a second party, a request to generate authenticating indicia; (2) using at least one of a plurality of computer processors, generating the authenticating indicia; (3) transmitting, over a network, the authenticating indicia to the electronic device of a first party and to the electronic device of the second party; (4) receiving, from an electronic device of the second party, an indication that the second party has confirmed that the first party is authentic; and (5) storing an identity of the first party, the second party, and the authenticating indicia in a database.

In one embodiment, the request may further include an identification of an issue, and the identification of the issue is provided to the second party with the account information for the first party.

The request to generate authenticating indicia, may be received from an application executed by at least one computer processor in the electronic device of the first party.

In one embodiment, the indicia may be generated as a random number. In another embodiment, the indicia may be generated as a pseudo-random number.

In one embodiment, the indicia may comprise alphanumeric characters.

In one embodiment, the computer processor that generates the authenticating indicia, the electronic device of the first party, and the electronic device of the second party may be within the same network.

In one embodiment, the received authenticating indicia and the authenticating indicia correspond if they are the same. In another embodiment, the received authenticating indicia and the authenticating indicia correspond if they are substantially the same. In another embodiment, the received authenticating indicia and the authenticating indicia correspond if they are related.

In another embodiment, a method of providing first party information to a second party may include (1) receiving, at a first server, account login information from an electronic device for a first party; (2) receiving, at the first server, a request from the first party to contact a second party; (3) using at least one of a plurality of computer processors, generating authenticating indicia; (4) transmitting, over a network, the authenticating indicia to the electronic device of a first party; (5) associating, using at least one of a plurality of computer processors, account information for the first party with the authenticating indicia; (6) receiving, at a voice response system, a communication from the first party, the first party further providing the authenticating indicia; (7) retrieving the account information associated with the authenticating indicia; (8) transferring the communication to a second party; and (9) providing the account information for the first party to the second party.

In one embodiment, the request may further include an identification of an issue, and the identification of the issue is provided to the second party with the account information for the first party.

The request to generate authenticating indicia, may be received from an application executed by at least one computer processor in the electronic device of the first party.

In one embodiment, the indicia may be generated as a random number. In another embodiment, the indicia may be generated as a pseudo-random number.

In one embodiment, the indicia may comprise alphanumeric characters.

In one embodiment, the computer processor that generates the authenticating indicia, the electronic device of the first party, and the electronic device of the second party may be within the same network.

In one embodiment, the received authenticating indicia and the authenticating indicia correspond if they are the same. In another embodiment, the received authenticating indicia and the authenticating indicia correspond if they are substantially the same. In another embodiment, the received authenticating indicia and the authenticating indicia correspond if they are related.

In another embodiment, a method of providing first party information to a second party may include (1) receiving, at a first server, account login information from an electronic device for a first party; (2) receiving, at the first server and from the first party, an identification of an issue and a request to contact a second party; (3) associating a communication link with a second party with account information for the first party and the issue; (4) transmitting, from the first server, the communication link with the second party to the first party; and (5) providing the account information for the first party and the issue to the second party.

The method may further include (6) transmitting, from the first server, the communication link with the second party to a voice response system.

In another embodiment, a method for communicating between a first party and a second party may include (1) monitoring, using at least one of a plurality of processors, at least one social media source for a comment by a first party regarding a second party; (2) using at least one of a plurality of computer processors, generating authenticating indicia; (3) associating the authenticating indicia with first party information and the comment; (4) sending, to the first party, the authenticating indicia and a request to contact the second party; and (5) sending, to the second party, the authenticating indicia, first party information and the comment.

The method may further include sending a request to login to an account the first party has with the second party hosted by a server; sending the authenticating indicia to the server; and receiving first party account information from the server.

The method may further include receiving account information for the first party.

In one embodiment, the authenticating indicia and a request to contact the second party may be sent to the first party in a private message.

In one embodiment, the first party information may include identification used by the first party with the social media source.

In one embodiment, the request may further include an identification of an issue, and the identification of the issue is provided to the second party with the account information for the first party.

The request to generate authenticating indicia, may be received from an application executed by at least one computer processor in the electronic device of the first party.

In one embodiment, the indicia may be generated as a random number. In another embodiment, the indicia may be generated as a pseudo-random number.

In one embodiment, the indicia may comprise alphanumeric characters.

In one embodiment, the computer processor that generates the authenticating indicia, the electronic device of the first party, and the electronic device of the second party may be within the same network.

In one embodiment, the received authenticating indicia and the authenticating indicia correspond if they are the same. In another embodiment, the received authenticating indicia and the authenticating indicia correspond if they are substantially the same. In another embodiment, the received authenticating indicia and the authenticating indicia correspond if they are related.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
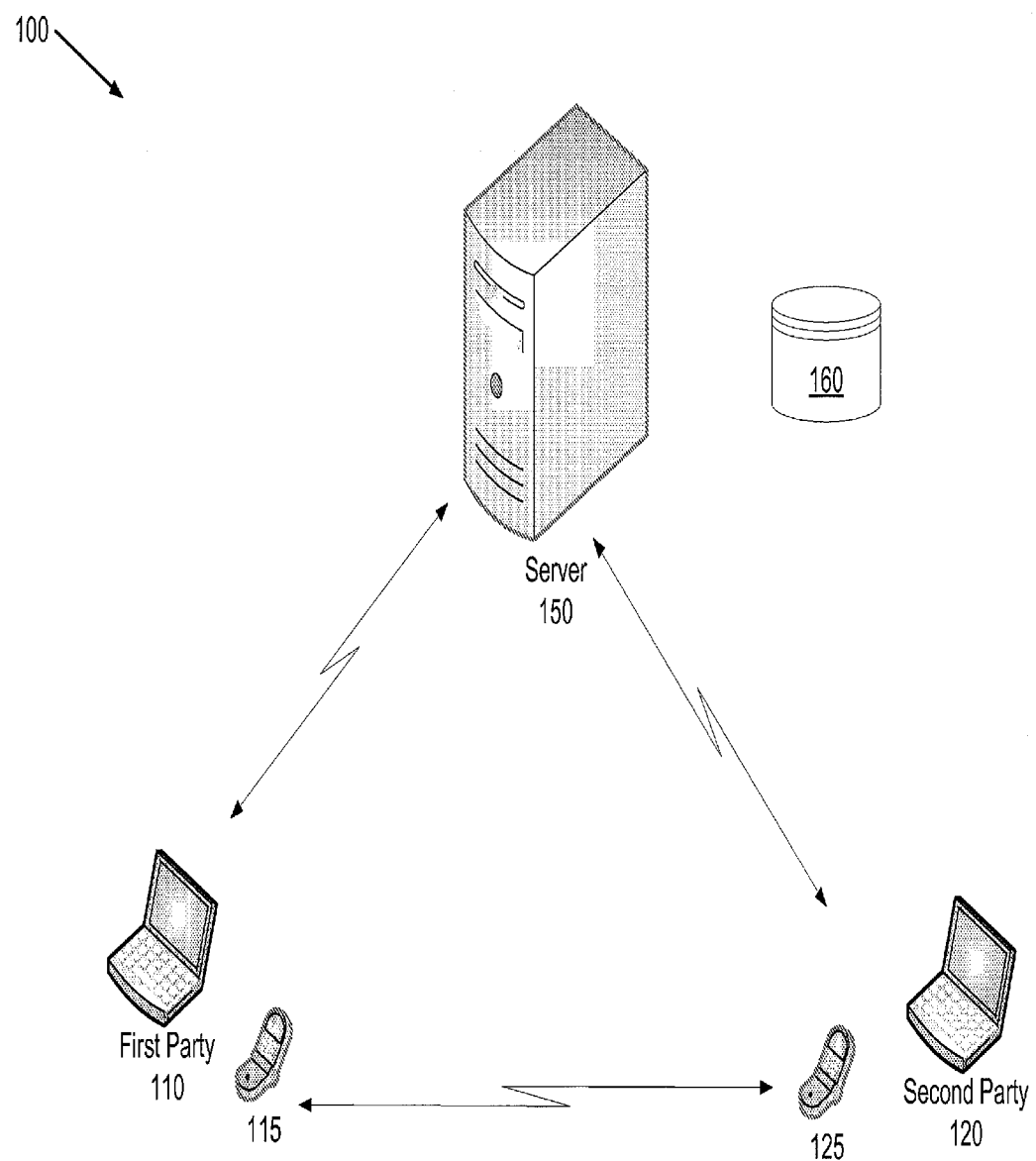
FIG. 1 discloses a block diagram of a system for user identification and authentication according to one embodiment.

Several embodiments of the present invention and their advantages may be understood by referring to FIGS. 1-7, wherein like reference numerals refer to like elements.

The disclosures of the following are hereby incorporated, by reference, in their entireties: U.S. Pat. No. 7,058,817, U.S. Pat. No. 7,155,614, U.S. Pat. No. 7,966,496, U.S. Pat. No. 7,444,672, U.S. patent application Ser. No. 12/261,259, U.S. patent application Ser. No. 13/325,619, U.S. patent application Ser. No. 13/154,817, U.S. patent application Ser. No. 11/610,289, and U.S. patent application Ser. No. 12/183,872.

Systems and methods for user identification and authentication are disclosed. According to one embodiment, the identity of the initiating user may be quickly and effectively verified. As will be discussed in greater detail, the parties seeking authentication may be presented with some sort of indicia and may independently verify that the other party is in possession of the appropriate indicia before continuing the conversation (e.g., voice, text, video, etc.). Examples of indicia include numbers and/or characters, images, glyphs, machine-readable codes (e.g., bar codes, QR codes, etc.).

In another embodiment, the indicia may be, or may include, biometrics (e.g., voice, retina scan, fingerprint, etc.).

Any suitable indicia may be used as necessary and/or desired.

For example, both parties may be presented with the same indicia and may exchange this indicia to authenticate each other. In another embodiment, one party may receive the indicia from the other party and use this to authenticate the other party.

In other embodiments, the parties may be presented with indicia that has some relationship, such as two halves of an object, similar animals, sequential numbers, portions of the same saying, etc. Any suitable indicia may be used as is necessary and/or desired.

In one embodiment, the indicia may be provided from a secure server with which at least one of the parties has a secure communication link. In another embodiment, the indicia may be provided on a webpage, by email, by SMS, by facsimile, by instant message, by iMessage, personal "tweets" or other messages, etc. In one embodiment, the indicia may be provided on a user's computer desktop.

Once the parties confirm that they have been provided with the appropriate indicia, thereby authenticating at least one party to the other, the parties may engage in open communications. Note that the party who is initiating the conversation may not need additional authentication as the initiating party authenticated the receiving party to a certain extent by calling the receiving party.

In one embodiment, however, the initiating party may request that the receiving party provide a second indicia as is necessary and/or desired.

In one embodiment, the indicia may be used as a reference for the conversation, and may be used to store a record of the conversation (e.g., if the audio and/or video of the call is recorded), any documents exchanged, screen captures, keystrokes, evaluations, etc.

In on embodiment, the code may be used as a reference to add other support agents to the session, to transfer the call to another agent, etc. In one embodiment, a subsequent agent may retrieve some or all of the call information by entering the indicia.

The system may also use IP-based telephony and associate the call with the indicia. The call may be routed to other participants as necessary.

In one embodiment, a subsequent agent may access an ongoing call, chat, video conference, etc. by entering the indicia.

Referring to FIG. 1, a system for user identification and authentication is depicted. System 100 may include first party 110, second party 120, server 150, and database 160. In one embodiment, first party 110 may be the initiator of a communication and second party 120 may be the receiver.

Server 150 may provide processing to generate indicia for both first party 110 and second party 120.

Although the devices used by first party 110 and second party 120 are depicted as laptop computers, any suitable device may be used, including desktop computers, laptop computers, tablet computers, e-readers, personal digital assistants, mobile phones, etc.

In one embodiment, the electronic devices used by first party 110 and second party 120 may execute a program. In one embodiment, the program may provide an interface for the generation and/or submission of indicia to server 150. In another embodiment, the program may generate the indicia and transmit the indicia to server 150.

First party 110 and second party 120 may each communicate with server 150 using any suitable communication means, such as a local area network, wide area network, a virtual private network, the Internet, etc. In one embodiment, one or both of these communication channels may be a secure communications means.

First party 110 and second party 120 may also communicate with each other by, for example, telephones 115 and 125. Telephones 115 and 125 may be any suitable type of telephone, including landlines, voice over IP, mobile phones, mobile radios, etc.

In another embodiment, first party 110 and second party 120 may communicate by social media, such as Twitter, Four Square, Facebook, etc.

In one embodiment, first party 110 and/or second party 120 may use a single device, such as a smartphone, a tablet, etc. that provides both the data access and communications capability of a computer and telephone.

In one embodiment, first party 110 and second party 120 may be employees, agents, or otherwise associated with the same organization. For example, first party 110 and second party 120 may both have access to the organization's network, and first party 110 may seek to communicate with second party 120 by an alternate communications means, such as the telephone.

For example, first party 110 may be an employee at a branch location for a company, and second party 120 may be a specialist at a centralized location. In another embodiment, second party 120 may be a help desk employee, a support employee, a contractor, a vendor, etc. First party 110 and second party 120 may have any suitable relationship.

In another embodiment, first party 110 may be a customer or client of an organization with which second party 120 is employed or associated. For example, first party 110 may be a customer of a provider of telecommunications services (e.g., satellite/cable TV, telephone, Internet, etc.), a financial institution (e.g., a bank, credit card company, etc.), and may seek to contact a general customer service number by, for example, telephone. The call may be routed to second party 120.

In still another embodiment, first party 110 may be accessing account information, such as for a financial account, and may wish to contact a representative with a query. For example, first party 110 may use a smart phone and may highlight a transaction to discuss with a representative.

Database 160 may be provided for first party 110 and/or second party 120, and may contain information usable by either party. For example, database 160 may contain account information for first party 110 or second party 120, including historical data, employment information, personal information (e.g., photograph, contact information), professional information (e.g., job title, education, specialties, skills, etc.), reputation information, etc.

In one embodiment, database 160 may include products that either first party 110 or second party 120 may own, have registered, etc. It may contain a record of known issues that either party may have, open or closed job/order/repair tickets, etc. It may contain purchase history, customer service history, etc. Any information that may be helpful or useful may be used as necessary and/or desired.

System 100 may include additional equipment for sharing data, such as scanners, facsimiles, digital cameras, video cameras, microphones, machine readable code readers (e.g., bar code readers, QR code readers), etc.

As noted above, server 150 may use at least one computer processor executing a computer program that generates indicia for first party 110 and second party 120. In one embodiment, the indicia may be generated by a random number generator, a pseudo-random number generator, such as "Random Class." Other code or indicia generators may be used as necessary and/or desired.

In one embodiment, the indicia may expire, for example, after the passage of a predetermined amount of time. In one embodiment, first party 110 may be able to extend the time period, number of uses, etc. for the indicia by requesting such.

In another embodiment, the indicia may not have a specified expiration.

Figure 2:
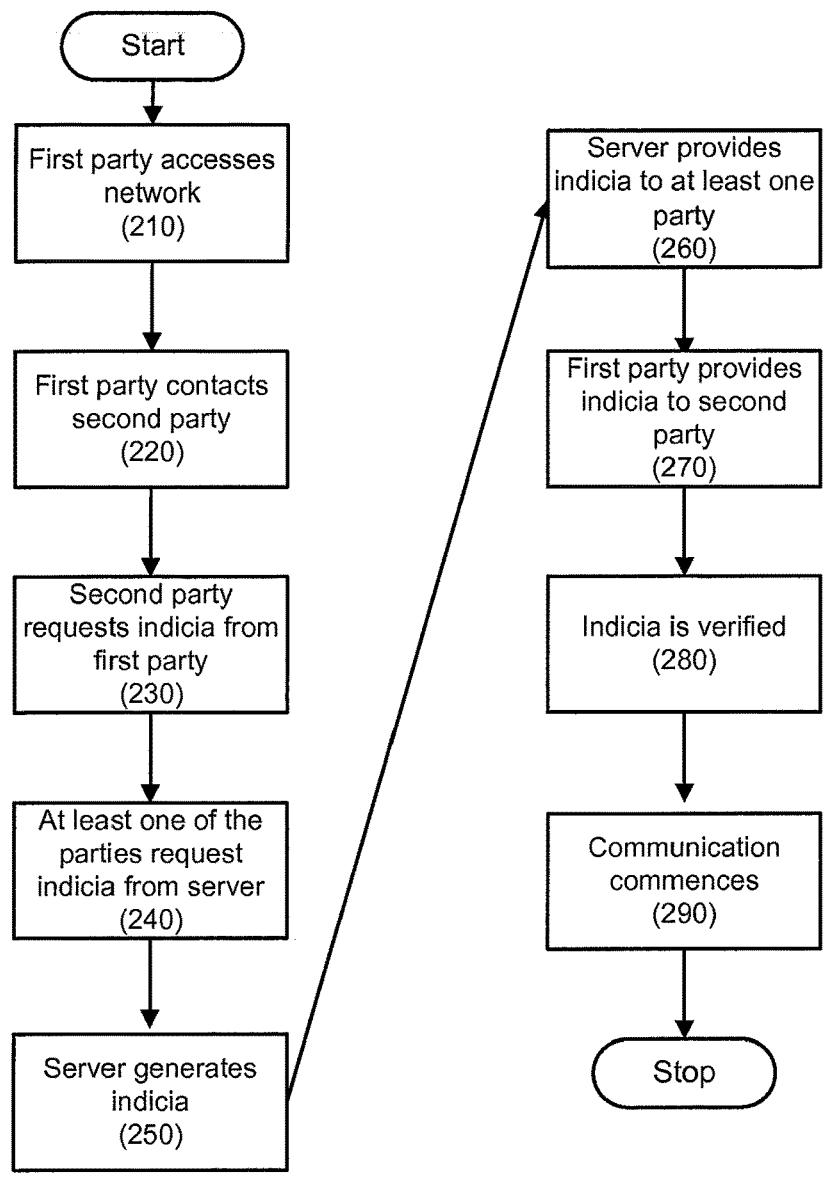
FIG. 2 discloses a flowchart depicting a method user identification and authentication according to one embodiment.

Referring to FIG. 2, a flowchart depicting a method for user identification and authentication according to one embodiment is provided. In step 210, the first party may access a computer network. Any suitable network may be used. In one embodiment, the user may access a secure network, such as a virtual private network.

In step 220, the first party may contact the second party. As noted above, the first party and the second party may both be associated with the same organization. In another embodiment, the first party and the second party may not have such a relationship.

In one embodiment, the first party may contact the second party by telephone. In another embodiment, the first party may contact the second party by electronic mail, instant message, text chat, video chat, etc. Any suitable communication method may be used as necessary and/or desired.

In step 230, the second party may request that the first party provide authenticating information, such as indicia.

In step 240, at least one of the first and second party may request that that server generates indicia. In one embodiment, the first and second party may be provided with a program that may be executed by a computer terminal that causes the server to generate the indicia. In one embodiment, the program may be an applet. In another embodiment, the program may be part of a computer desktop for an organization. In another embodiment, the program may be executed by or on a webpage. In another embodiment, the program may be provided as a mobile application.

In one embodiment, the program may be executed by selecting an icon that may be displayed on a screen. In another embodiment, the program may be a desktop gadget, widget, etc.

In another embodiment, one party, such as the first party, may request that indicia be generated, while the other party, such as the second party, will enter the indicia as it is received from the other party.

In step 250, the server may generate indicia. As noted above, any suitable indicia may be generated, including random numbers, pseudo-random numbers, images, characters, etc.

In another embodiment, the indicia that is provided to the first party and the second party may not be identical, but may be related. For example, the indicia may be complementary (e.g., each forms part of a whole image, saying, etc.), inverses of each other, etc. In one embodiment, the first party may receive indicia that consists of numbers, and the second party may receive a sum of those numbers.

In another embodiment, the second party may receive an instruction with its indicia that may provide guidance on the indicia. For example, the second party may receive the same indicia that the first party receives, but in reverse order. The second party may be instructed to read the indicia in reverse order.

In another embodiment, there may be no discernable relationship between the indicia except that the indicia may be linked by the server, or stored as a pair. Thus, if both parties enter their respective indicia at verification, the server will verify that the two are linked.

Any other suitable relationship between indicia may be used as necessary and/or desired.

In step 260, the server may provide the indicia to at least one of the first and second parties. In one embodiment, the indicia may be provided to the first party only.

In one embodiment, the indicia may be provided as an image and the image may be distorted to reduce the likelihood of a machine intercepting and interpreting the indicia. This may be similar to the distortion used with the CAPTCHA program.

In another embodiment, the indicia may be provided to at least one of the parties audibly.

The indicia may be provided in any suitable way. In one embodiment, the indicia may be provided to a workspace operating on the first party's and/or second party's computer terminals. In another embodiment, the indicia may be provided in a window, such as a pop-up window, in a banner, in a separate window, in a desktop gadget/widget, etc. In another embodiment, the indicia may be provided in a separate communication, such as an electronic mail, text message, instant message, iMessage, etc. In another embodiment, the indicia may be provided by telephone. In another embodiment, the indicia may be provided in a mobile application.

In step 270, the first party may provide the indicia to the second party. In one embodiment, the first party may provide the indicia verbally. In another embodiment, the first party may enter the indicia into a chat window. In still another embodiment, the first party may provide the indicia to the second party in an email, webpage, text message, etc.

In one embodiment, the indicia may be exchanged by "bumping." For example, if the indicia is received on a first mobile device, it can be "bumped" to a second device (mobile or otherwise) so the second device can provide that indicia to the other party.

In step 280, the indicia may be verified. In one embodiment, the second party may verify that the indicia received from the first party is the same as the indicia that is provided to the second party.

In one embodiment, the second party may verify that the indicia match by comparing the indicia displayed versus the indicia that is received. In another embodiment, the second party may enter the indicia that is received, and the server may inform the second party whether or not the indicia matches.

In one embodiment, if the second party manually verifies the indicia, the second party may inform the program of such.

In step 290, the communication may commence. In one embodiment, a time limit may be placed on the communication, and the parties may be required to be authenticated again if they wish to proceed.

In one embodiment, the method may be used by a first party to authenticate a third party to a second party. For example, a third party, such as a customer of a bank, may visit a branch office to conduct business. Before conducting business, or during the process of conducting business, the third party may authenticate himself to the first party by, for example, presenting a photo identification.

If the first party (e.g., the branch employee), needs assistance from a second party (e.g., a specialist, supervisor, management member, etc.) who is not co-located with the first party in order to assist the third party, the first party may authenticate himself or herself to the second party as described above. The first party may then inform the second party that he or she authenticated the third party, and may therefore pass the communication so the second party and the third party can converse.

Figure 3:
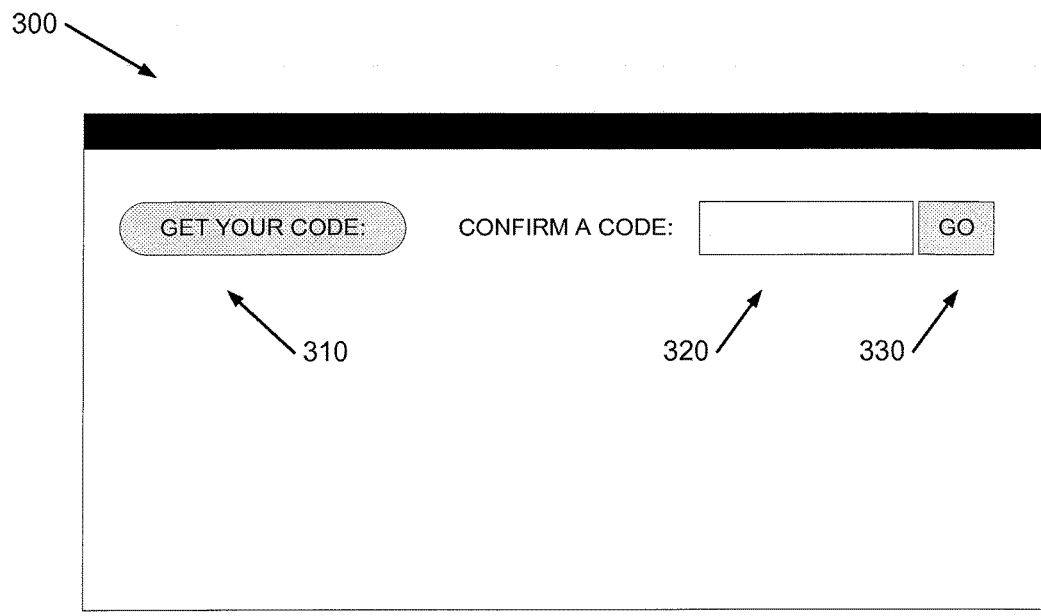
FIG. 3 discloses an exemplary code generation and entry interface according to one embodiment.

Referring to FIG. 3, an example of a code generation and entry interface is provided. Interface 300 includes button 310 to generate a code, and box 320 to enter a code, along with submit button 330. In one embodiment, both the first party and the second party may be provided with the same interface.

After verification, the parties may be provided with information about each other, including photos, supervisor's name, address, email address, recent connections, etc.

Following the connection, the first party and/or the second party may complete a post-call survey. In one embodiment, the survey may be conducted immediately following the connection. In another embodiment, the survey may be conducted at any time up to a predetermined time.

Figure 4:
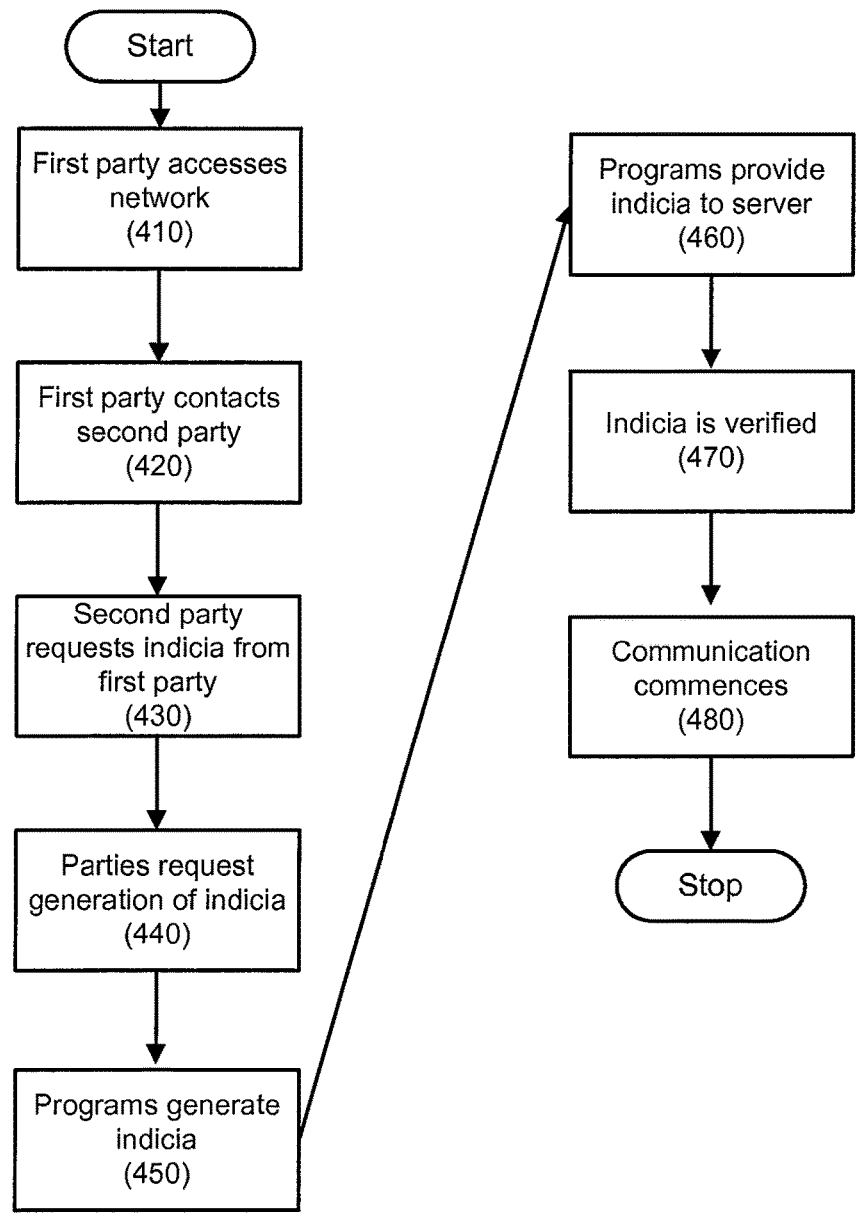
FIG. 4 discloses a flowchart depicting a method user identification and authentication according to one embodiment.

Referring to FIG. 4, a flowchart depicting a method for user identification and authentication according to one embodiment is provided. The method is similar to that depicted in FIG. 2 except that in this embodiment, the indicia is generated by the respective workstations for the first and second parties.

In step 410, the first party may access a computer network, such as a virtual private network. This is similar to step 210.

In step 420, the first party may contact the second party. This is similar to step 220.

In step 430, the second party may request that the first party provide authenticating information, such as indicia.

In step 440, the first and second party may execute programs that cause indicia to be generated by programs executing on their workstations.

In step 450, the programs may generate the indicia. The indicia that is generated may be similar to that described above with respect to step 250.

In step 460, the first and second parties may each provide their indicia to a server. This may be done by manually entering the indicia, by causing the indicia to be sent to the server, through a voice response system, etc.

In step 470, the indicia may be verified by the server. If the indicia is verified, in step 480, the sever informs the parties of such and communication commences.

Figure 5:
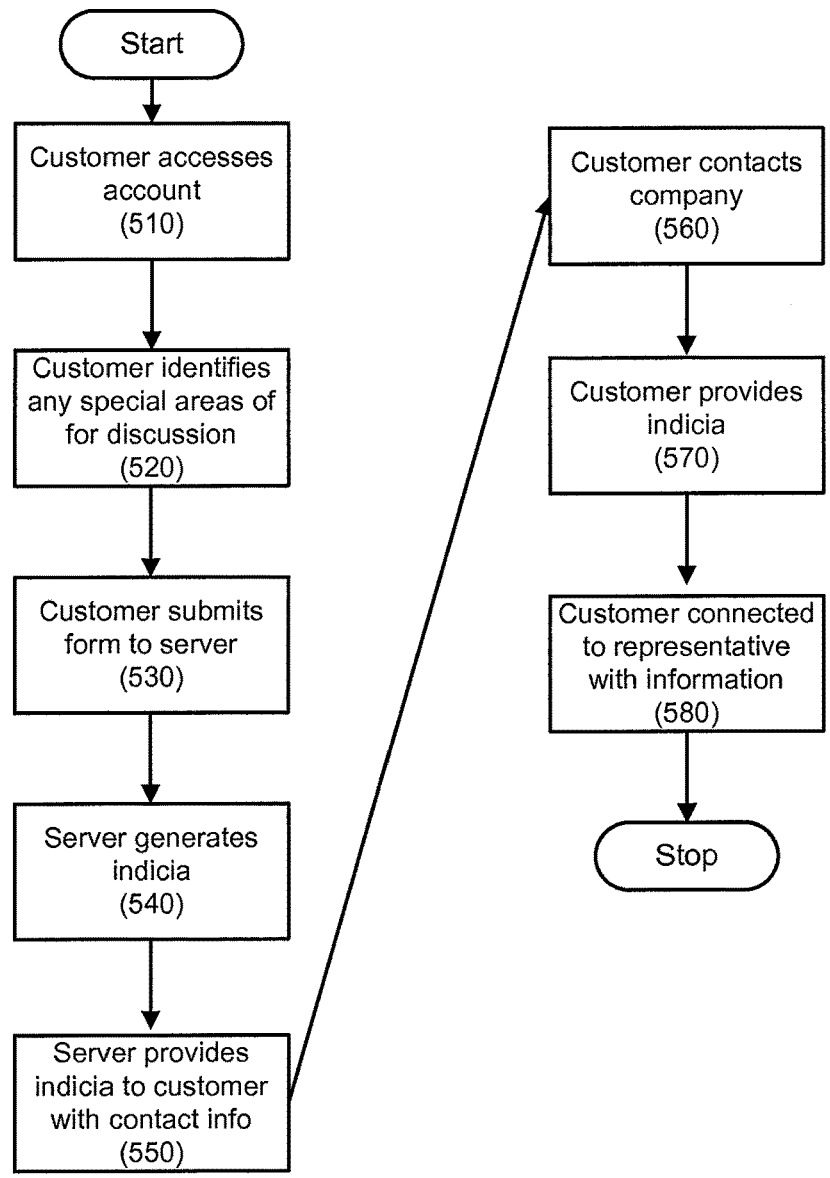
FIG. 5 discloses a flowchart depicting a method user identification and authentication according to one embodiment.

Referring to FIG. 5, a flowchart depicting a method for user identification and authentication according to one embodiment is provided. In step 510, a customer may access an online account he or she may have with the service provider.

In one embodiment, the customer may "sign in" to the account by entering, for example, a user identifier and a password. In one embodiment, the customer may be required to enter additional information, confirm an image, etc. before being granted access to his or her account information.

In step 520, the customer may identify any area(s), topic(s), issue(s), etc. that he or she may wish to discuss with the service provider's representative.

In one embodiment, a "drop down" list may be provided with options, such as "Inquire about charge," "Dispute charge," etc. In another embodiment, the customer may be presented with different reasons for contacting a representative, such as "billing," "change of address," etc. In still another embodiment, the customer may be presented with a text box in which to enter the reason for contact.

In step 530, the customer may submit the area(s), topic(s), or issue(s) that he or she may wish to discuss with the representative. For example, the customer may click on a "submit" icon next to a charge, after the text box, etc.

In step 540, a server may generate indicia. In one embodiment, the indicia may be associated with the area(s), topic(s), issue(s), etc. identified by the customer.

In step 550, the indicia may be provided to the customer. For example, the indicia may be provided to the customer on a webpage, in a pop-up window, or in a separate communication, such as an email, text message, etc.

Figure 6:
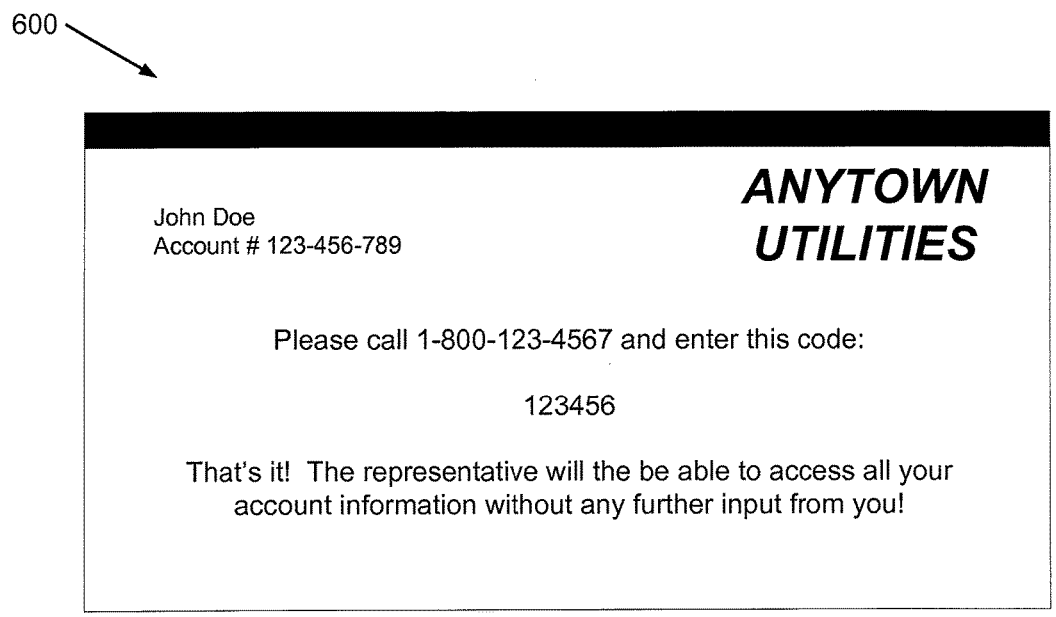
FIG. 6 is an example screenshot of a user interface according to one embodiment.

An example screenshot is provided in FIG. 6.

In step 560, the customer may contact the company. In one embodiment, the customer may also be provided with a telephone number to call, and instructions to reference the indicia during the call. In one embodiment, if supported by the customer's device, the customer may be able to initiate a telephone call, a chat session, etc. directly from the device.

In another embodiment, the customer may be provided with a link to a chat window.

In step 570, the customer may provide the indicia to the company. In one embodiment, the indicia may be provided orally to a representative. In another embodiment, the indicia may be provided to an automated response system.

In one embodiment, in step 580, after the indicia is received, the customer may be transferred to a representative. In one embodiment, the representative may be provided with customer information, which may include the area(s), topic(s), issue(s), etc. identified by the customer. In another embodiment, it may further include customer history, including past calls that may be related to the area(s), topic(s), issue(s), etc. identified by the customer. In another embodiment, the representative may be provided with other customer information, history, etc. as necessary and/or desired.

Figure 7:
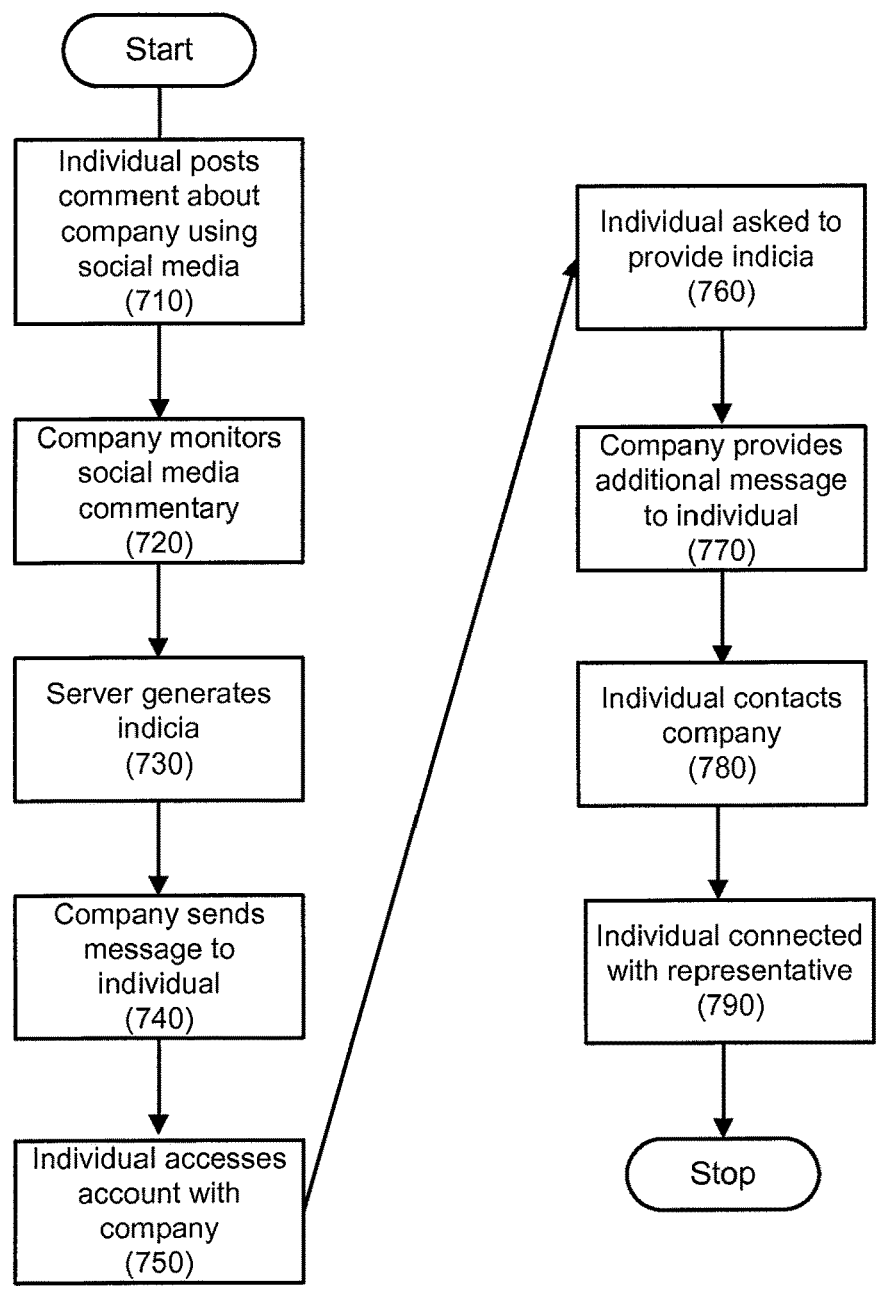
FIG. 7 discloses a flowchart depicting a method user identification and authentication according to one embodiment.

Referring to FIG. 7, a flowchart depicting a method for user identification and authentication according to one embodiment is provided. In step 710, an individual may use social media to inform others of an issue that he or she may be having with a company. Any social media may be used.

For example, an individual may post an issue he or she may have with an airline, such as "I can't believe that Airline X has lost my luggage!"

In step 720, a company may monitor the individual's comments. In one embodiment, companies other than the company at issue may monitor the comments.

In step 730, a server may generate indicia to be provided to the individual.

In step 740, the company may send a message directly to the individual. In one embodiment, the message may include the indicia.

In one embodiment, the message may further include a link to the company's website and instructions for the individual to log in to his or her account.

As noted above, the company may or may not be the company that is being addressed in the individual's comments.

In step 750, the individual may access his or her account.

In step 760, the individual may be asked to enter the indicia.

In step 770, the individual may be provided with a message from the company. For example, the individual may be provided with an apology, an offer, a coupon, a discount, etc.

In one embodiment, the individual may be asked if the message addressed the individual's issue. If it did, in one embodiment, the company may alert social media that it addressed the individual's concerns.

If it did not, or instead of an offer, discount, coupon, etc., the individual may be may be provided with contact information to contact the company by telephone, chat, etc. In one embodiment, the individual may be provided with a second indicia to provide in the subsequent communication.

In step 780, the individual may contact the company and may provide the first and/or second indicia similar to step 560 and 570, above.

In step 790, the individual may be connected with a representative similar to step 580, above.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for communicating between a first party and a second party, comprising:
   in an information processing apparatus for a second party:
      at least one of a plurality of processors monitoring electronic messages posted on at least one open social media site for an electronic comment by a first party regarding a second party;
      the at least one computer processor generating identifying indicia and associating the identifying indicia with the electronic comment;
      the at least one computer processor associating the identifying indicia for the electronic comment with identifying information for the first party;
      the at least one computer processor sending, to an electronic device associated with the first party, the identifying indicia and an electronic link for a web interface with an agent of the second party; and
      the at least one computer processor sending, to a computer terminal associated with the agent for the second party, the identifying indicia for the electronic comment, the identifying information for the first party, the electronic comment, and the electronic link.

2. The method of claim 1, wherein the identifying indicia for the electronic comment and the electronic link are sent to the first party in a private message.

3. The method of claim 1, further comprising:
   sending a request to login to an account the first party has with the second party hosted by a server;
   sending the identifying indicia for the electronic comment to the server; and
   receiving first party account information from the server.

4. The method of claim 1, wherein the first party information comprises identification used by the first party with the open social media source.

5. The method of claim 1, further comprising:
receiving account information for the first party.

\* \* \* \* \*